(12) United States Patent
Tohki (10) Patent No.: US 6,970,958 B2
(45) Date of Patent: Nov. 29, 2005

(54) IMAGE OUTPUT APPARATUS WHICH STORES OUTPUT DATA IN ACCORDANCE WITH FORM OR STATE OF OUTPUT

(75) Inventor: Shinsaku Tohki, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 87 days.

(21) Appl. No.: 10/393,253

(22) Filed: Mar. 21, 2003

(65) Prior Publication Data

US 2003/0191871 A1 Oct. 9, 2003

(30) Foreign Application Priority Data

Apr. 3, 2002 (JP) .................................... 2002-101570

(51) Int. Cl.[7] .............................................. G06F 13/00
(52) U.S. Cl. ............................ 710/72; 710/33; 710/62; 715/530; 707/205
(58) Field of Search ........................ 710/33–34, 52–74, 710/5–7; 707/205; 715/530–541

(56) References Cited

U.S. PATENT DOCUMENTS 5,388,167 A * 2/1995 Koga et al. .................. 382/232

6,562,077 B2 * 5/2003 Bobrow et al. .............. 715/517

FOREIGN PATENT DOCUMENTS

| JP | H11-225255 | 8/1999 |
|----|------------|--------|
| JP | H11-175290 | 9/1999 |

* cited by examiner

*Primary Examiner*—Christopher B. Shin
(74) *Attorney, Agent, or Firm*—Nixon & Vanderhye P.C.

(57) ABSTRACT

An image output apparatus 1 performs output processes of a plurality of kinds of image data in different forms or states in accordance with the forms of the image data, and includes an image storage unit 100 for storing or saving the image data having undergone the output processes by sorting the image data in accordance with the forms thereof. Since the image data having once undergone the output processes are stored or saved in the image storage unit 100, if there is a need to output again the image data having once undergone an output process for the reason that the first output process has failed or the number of copies printed in the first output process has been insufficient, the same image data need not be input again, and thus, the load on the apparatus can be reduced and the image data can be output again in a short time.

5 Claims, 7 Drawing Sheets

(a) FIRST STORAGE DEVICE JOB LIST

| | DATE/TIME | MODE | USER NAME | JOB NAME | PAPER SIZE | PAPER TYPE | PRINT TYPE | NUMBER OF COPIES |
|---|---|---|---|---|---|---|---|---|
| 1 | 2001/12/04 15:42 | COPY | ***** | ***** | A3 | PRINTED PAPER | SINGLE-SIDE | 3 |
| 2 | 2001/12/01 20:10 | FAX TRANSMISSION | ***** | ***** | A4 | PLAIN PAPER | SINGLE-SIDE | 1 |
| 3 | 2001/12/01 11:03 | Scan to E-Mail | ***** | ***** | B5 | PLAIN PAPER | SINGLE-SIDE | 1 |
| 4 | 2001/11/30 19:56 | PRINTER | ***** | ***** | A4 | COLORED PAPER | DOUBLE-SIDE | 10 |
| 5 | 2001/11/30 09:40 | I-FAX TRANSMISSION | ***** | ***** | A4 | PLAIN PAPER | SINGLE-SIDE | 5 |
| 6 | 2001/11/29 12:09 | PC-FAX TRANSMISSION | ***** | ***** | B4 | PLAIN PAPER | SINGLE-SIDE | 1 |

(b) SELECTION OF DESTINATION FOLDER FOR IMAGE DATA IN SECOND STORAGE DEVICE

COPY   PRINTER   FAX TRANSMISSION   FAX RECEPTION   Scan to PC   Scan to E-Mail   INTERNET-FAX TRANSMISSION   INTERNET-FAX RECEPTION   PC-FAX TRANSMISSION

IMAGE OUTPUT APPARATUS WHICH STORES OUTPUT DATA IN ACCORDANCE WITH FORM OR STATE OF OUTPUT

BACKGROUND OF THE INVENTION

The present invention relates to an image output apparatus which is implemented in the form of a digital combined system that unites features of a copier, a facsimile machine, a printer or the like. In particular, it relates to an image output apparatus that has image storage means for storing image data which has once undergone an output process for reuse.

DESCRIPTION OF THE RELATED ART

Output (printing) features implemented in a conventional digital combined system include a print server feature, such as "confidential printing".

This feature allows the system to temporarily store, together with a password, print data transmitted from a client system connected thereto via a network without outputting (printing) the data and, in response to a succeeding instruction, to print out the stored data as a job after confirming the password.

Furthermore, there is a feature (build job feature) that allows the system to temporarily store image data transmitted from a client system connected thereto via a network without outputting (printing) the data and, in response to a succeeding instruction, to combine a plurality of desired jobs in a list of print jobs, thereby printing out the stored data as one job.

The image data of the job printed out via these features is essentially deleted from the memory, such as a hard disk, in the system when the print process is completed.

However, recently, there has been proposed an arrangement that allows the input image data to be saved in the memory of the system even after the print job is completed.

This arrangement enables the image data having been once printed out to be output (or printed out) a plurality of times without having to input the image data again.

In the past, for example, in Japanese Patent Laid-Open No. 11-175290, there has been disclosed a printer apparatus that, even after a print job undergoes an output process, stores the associated image data in the apparatus, and when an instruction to output the print job is received from an external apparatus, executes the print job in accordance with the instruction including the number of copies and the necessity of post-processing.

In Japanese Patent Laid-Open Nos. 11-225255 and 9-284518, there are disclosed image forming apparatuses having a function of storing image data having undergone an output process in the apparatus.

However, in the conventional apparatuses disclosed in Japanese Patent Laid-Open Nos. 11-175290, 11-225255 and 9-284518 mentioned above, the image data having once undergone an output process are deleted after a lapse of a certain time, or even if the image data are stored, the data are simply stored in the order in which the data are stored in the apparatus. Thus, if a large quantity of image data is stored in the apparatus, a problem arises that desired image data is difficult to find at a later time.

The present invention has been devised in view of the above-described problems. An object of the invention is to provide an image output apparatus that allows desired image data to be easily found, can output the image data again in a shorter time and is improved in convenience.

SUMMARY OF THE INVENTION

An image output apparatus according to the invention is an image output apparatus that performs output processes of a plurality of kinds of image data indifferent forms or states in accordance with the forms or states of the image data, and comprises image storage means for storing or saving image data having undergone the output processes with the image data being sorted in accordance with the forms or states of the image data.

There is provided an image output apparatus which is implemented in the form of a digital combined system or the like integrating features of a copier, a facsimile machine and a printer, handles a variety of kinds of image data in different forms or states, such as image data read via a scanner, created with a personal computer (hereinafter abbreviated as a PC) or the like and received by a facsimile machine, and performs output processes, such as printing out, network transfer and facsimile transmission, in accordance with the forms or states of the image data. The image output apparatus stores or saves the image data having undergone output processes in the image storage means by sorting the image data in accordance with the forms or states thereof, for example, depending on whether the data has been printed out, network-transferred or facsimile-transmitted.

In the image output apparatus according to the invention, the image storage means comprises a first image storage section for storing or saving the image data having undergone the output processes, a second image storage section having separate storage areas for the respective forms or states of the image data, and storage management means for sorting the image data stored or saved in the first image storage section in accordance with the forms or states of the image data and storing or saving the sorted image data in the respective storage areas associated with the forms or states of the image data in the second storage section.

Image storage means for storing or saving image data having undergone output processes by sorting the image data in accordance with the forms or states of the image data comprises a first image storage section for storing or saving the image data having undergone the output processes, and a second image storage section having separate storage areas for the respective forms or states of the image data, and storage management means sorts the image data stored or saved in the first image storage section in accordance with the forms or states of the image data and stores or saves the sorted image data in the respective storage areas associated with the forms or states of the image data in the second storage section.

In the image output apparatus according to the invention, the storage management means has a function of determining whether or not to store/save the image data having undergone the output processes in the second image storage section in the image storage means in accordance with the forms or states of the image data.

The storage management means can previously determine whether or not to store/save the image data having undergone the output processes in the second image storage section in the image storage means for each of the forms or states of the image data.

In the image output apparatus according to the invention, the storage management means has a function of determining whether or not to store/save the image data having undergone the output processes in the second image storage section in the image storage means for each image data unit.

The storage management means can determine in advance whether or not to store/save the image data having undergone the output processes in the second image storage section in the image storage means for each image data unit.

DETAILED DESCRIPTION OF THE PREFERRED EMBODIMENTS

An embodiment of the invention will be described in detail below with reference to the drawings.

However, the invention is not limited to the description.

An image output apparatus according to the invention is incorporated into a digital combined system that unites features of a copier, a facsimile machine (abbreviated as FAX, hereinafter), a printer and the like. The apparatus has a function of performing an output process of various forms of image data.

Figure 1:
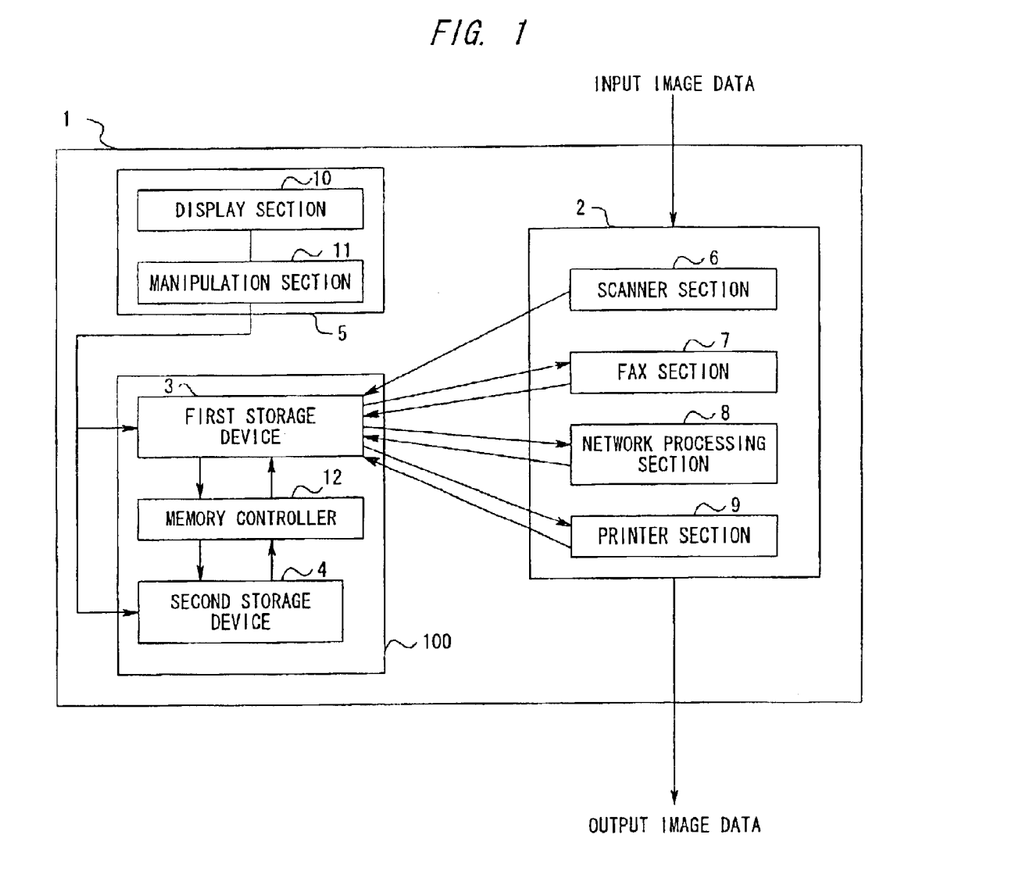
FIG. 1 is a block diagram showing an electrical configuration of an image output apparatus according to an embodiment of the invention.

FIG. 1 is a block diagram showing an electrical configuration of an image output apparatus according to an embodiment of the invention.

An image output apparatus 1 of the invention is to perform output processes of plural kinds of image data in different forms/states (described simply as "forms", hereinafter) in accordance with the forms. As shown in FIG. 1, the apparatus has image storage means 100 for storing/saving (described simply as "store", hereinafter) the output image data with the image data being sorted in accordance with the form.

As shown in FIG. 1, the image output apparatus 1 comprises an image processor 2, the image storage means 100 and a manipulation panel 5.

The image storage means 100 of the image output apparatus 1 of the invention comprises a first storage device 3 which serves as a first image storage for storing the image data which has undergone an output process, a second storage device 4 which serves as a second image storage having separate storage areas for the respective forms of image data, and a memory controller 12 serving as storage management means that sorts the image data stored in the first storage device 3 in accordance with the forms and stores the sorted data in the respective storage areas of the second storage device 4.

The memory controller 12 of the image output apparatus 1 of the invention has a function of determining whether or not to store the image data which have once undergone an output process in the second storage device 4 of the image storage means 100 for each form thereof.

The memory controller 12 of the image output apparatus 1 of the invention has a function of determining whether or not to store the image data which have undergone an output process in the second storage device 4 of the image storage means 100 for each job, each job being a unit of image data.

As shown in FIG. 1, the image processor 2 comprises a scanner section 6, a fax section 7, a network processing section 8 and a printer section 9, which are image processing sections which perform output processes of different forms of image data.

For example, the scanner section 6 of the image processor 2 reads image data or the like to be copied by electronically exposure-scanning the data.

The fax section 7 of the image processor 2 comprises a fax receiver (not shown) and a fax transmitter (not shown).

The fax receiver of the fax section 7 of the image processor 2 performs an output process of the image data received from a party at the other end, and the printer section 9 of the image processor 2 described later records as received image the fax-received image data on a recording medium, for example, a sheet of copy paper.

Here, the image data fax-received by the fax receiver of the fax section 7 of the image processor 2 can also be output to a PC or the like connected thereto via a network.

The fax transmitter of the fax section 7 of the image processor 2 transmits, as an output process, the image data or the like read by the scanner section 6 of the image processor 2 to a specified destination as a fax signal.

In addition to the output process of the fax-received image data described above, the printer section 9 of the image processor 2 performs output of image data for which an print instruction is received from the PC connected thereto via the network or image data read by the scanner section 6 of the image processor 2, and prints the image data onto a recording medium, for example, a sheet of paper.

That is, the image processor 2 performs output processes of plural kinds of image data in different forms in accordance with the forms of the data to be output.

For example, in the case where the digital combined system having the image output apparatus 1 serves as a copier, the scanner section 6 of the image processor 2 first reads image data from an original or the like, and the original image data read by the scanner section 6 of the image processor 2 is subjected to an image processing, for example, color correction, transmitted to an image forming unit (not shown) of the printer section 9 of the image processor 2, and then recorded onto a recording medium, for example, a sheet of paper.

Alternatively, in the case where the digital combined system having the image output apparatus 1 serves as a FAX, the original image data read by the scanner section 6 of the image processor 2 is subjected to an output processing for transmission or reception in the fax section 7 of the image processor 2, and then printed out by the image forming unit in the printer section 9 of the image processor 2 or transmitted to a destination fax.

Furthermore, in the case where the digital combined system having the image output apparatus 1 serves as a network scanner, the original image data read by the scanner section 6 of the image processor 2 is transmitted to a PC or the like, which is a destination specified via the network processing section 8 of the image processor 2.

Besides, image data transmitted from a PC connected thereto via a network is input to the image output apparatus 1 via a network processing section 8 of the image processor 2 and output (printed out) from the printer section 9 of the image processor 2.

The first storage device 3 of the image storage means 100 stores the image data which have undergone an output process in the image processor 2.

If image data which has once undergone an output process needs to be output again for the reason that the first output process has failed or the number of copies set in the first output process was not enough, the manipulation panel 5, a PC connected thereto via a network or the like is used to retrieve (instruct to select) the interest image data from the first storage device 3 of the image storage means 100 and transmit the retrieved image data to the image processor 2.

The second storage device 4 of the image storage means 100 is a region for saving the image data stored in the first storage device 3 by sorting the image data as described later.

The first storage device 3 of the image storage means 100 has a storage capacity smaller than that of the second storage device 4. When the available storage area decreases, new image data is stored by overwriting the oldest image data stored in the first storage device 3 with the new image data, for example.

Alternatively, image data having been stored in the first storage device 3 of the image storage means 100 for a certain period of time may be automatically deleted.

On the other hand, the image data saved in the second storage device 4 of the image storage means 100 is saved without being automatically deleted.

In the case where the second storage device 4 of the image storage means 100 has no storage area available, an error indication or the like is provided on a display section 10 of the manipulation panel 5 to inform the user. In response to this, the user deletes unnecessary image data, provides an add-in hard disk, replaces the hard disk with a new one with a larger capacity to increase the storage capacity, thereby providing or adding a new available storage area.

As described later, the second storage device 4 of the image storage means 100 includes, for example, a plurality of folders allocated to the respective forms of image data and can store the image data by sorting the data in accordance with the kinds thereof.

The manipulation panel 5 comprises the display area 10 and a manipulation section 11, as shown in FIG. 1.

The display section 10 of the manipulation panel 5 is a liquid crystal display screen or the like for displaying information about the operation state of the image output apparatus 1.

The manipulation section 11 of the manipulation panel 5 comprises various buttons arranged on the manipulation panel 5 for manipulating the image output apparatus 1 in accordance with the information displayed on the displayed section 10, a transparent tablet (transparent touch panel) provided over a display screen 10a of the display section 10, and the like.

The manipulation section 11 of the manipulation panel 5 allows the user to externally manipulate the image output apparatus 1.

Instructions from the manipulation section 11 of the manipulation panel 5 are transmitted to the first storage device 3, the second storage device 4 and the memory controller 12 of the image storage means 100.

The memory controller 12 controls data transfer between the first storage device 3 and the second storage device 4 and can transport the image data stored in the first storage device 3 into the respective folders in the second storage device 4 by sorting the image data in accordance with the forms thereof.

Furthermore, for example, such a setting can be made via the manipulation panel 5 that only the fax-received and fax-transmitted image data are sorted and saved in the second storage device 4, and the memory controller 12 can perform data transfer control in accordance with the setting.

Figure 2:
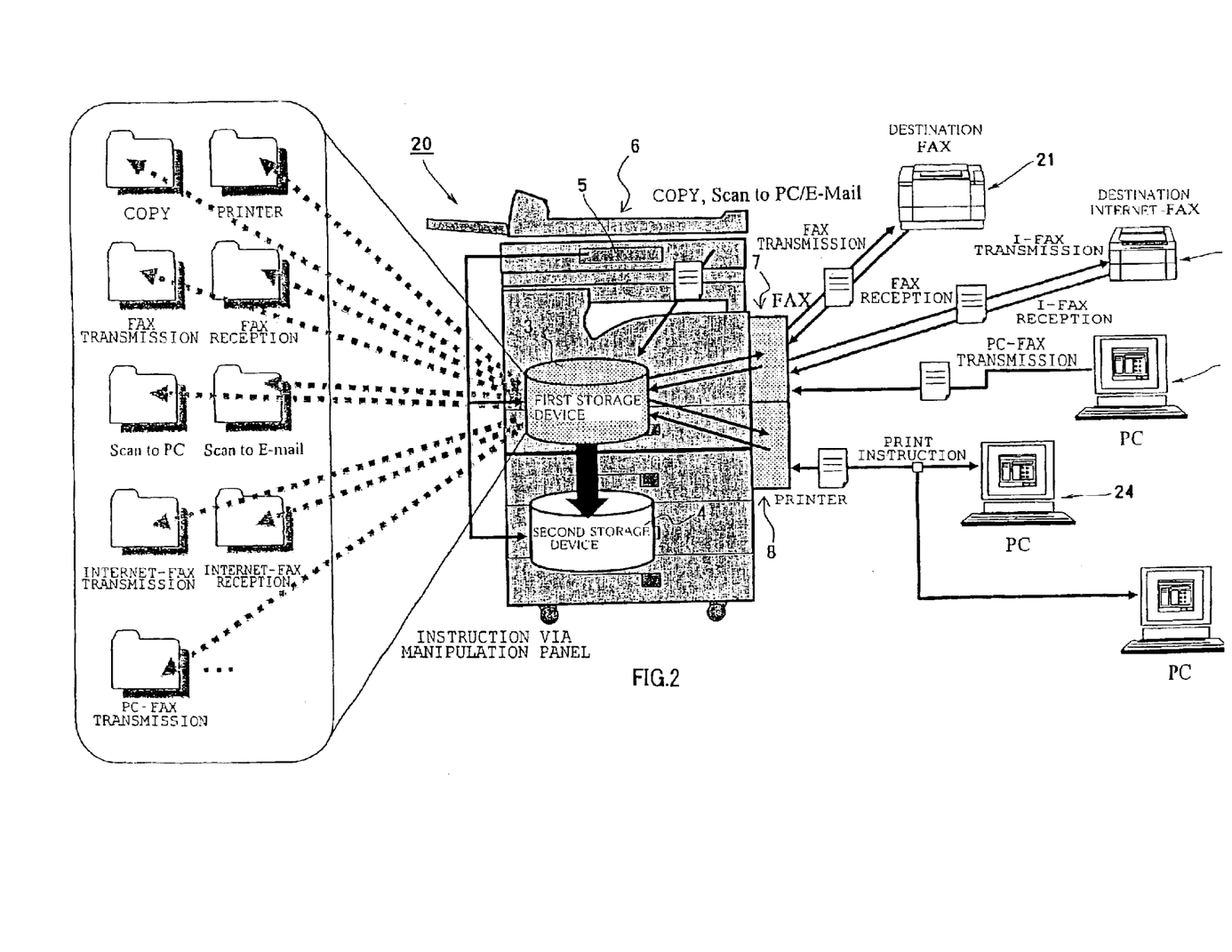
FIG. 2 is a schematic diagram showing a digital combined system having the image output apparatus of the invention and an arrangement of a first storage device.

FIG. 2 is a schematic diagram showing a digital combined system having the image output apparatus according to the invention and an arrangement of the first storage device.

As shown in FIG. 2, in addition to serving as a copier, a digital combined system 20 is connected to a destination fax 21, a destination Internet-fax 22 and a PC 23 for PC-fax transmission via an interface (the fax section 7), which is cable-, optical- or radio-based communication means, and can perform transmission and reception of a fax or the like.

In addition, as shown in FIG. 2, the digital combined system 20 is connected to a plurality of PCs 24 via a network and an interface (the network processing section 8), which is communication means, and can print out transmitted image data in response to a print instruction from the PCs 24.

According to the arrangement described above, the image output apparatus 1 of the invention temporarily stores every image data which has once undergone an output process in the first storage device 3, as shown in FIG. 2.

After that, as described later, only desired image data can be appropriately sorted and saved in the second storage device 4 without being deleted even after a lapse of a long time.

Thus, even if a sheet of paper recording the image data that previously had been fax-received is discarded, there is no need to ask the party at the other end to retransmit the data, and the image data can be printed out again.

Furthermore, since the image data saved in the second storage device 4 are sorted and organized, even if a large quantity of image data is saved in the second storage device 4, desired image data can be easily found and output again in a short time.

Now, an arrangement of the second storage device 4 will be described with reference to FIG. 3.

Figure 3:
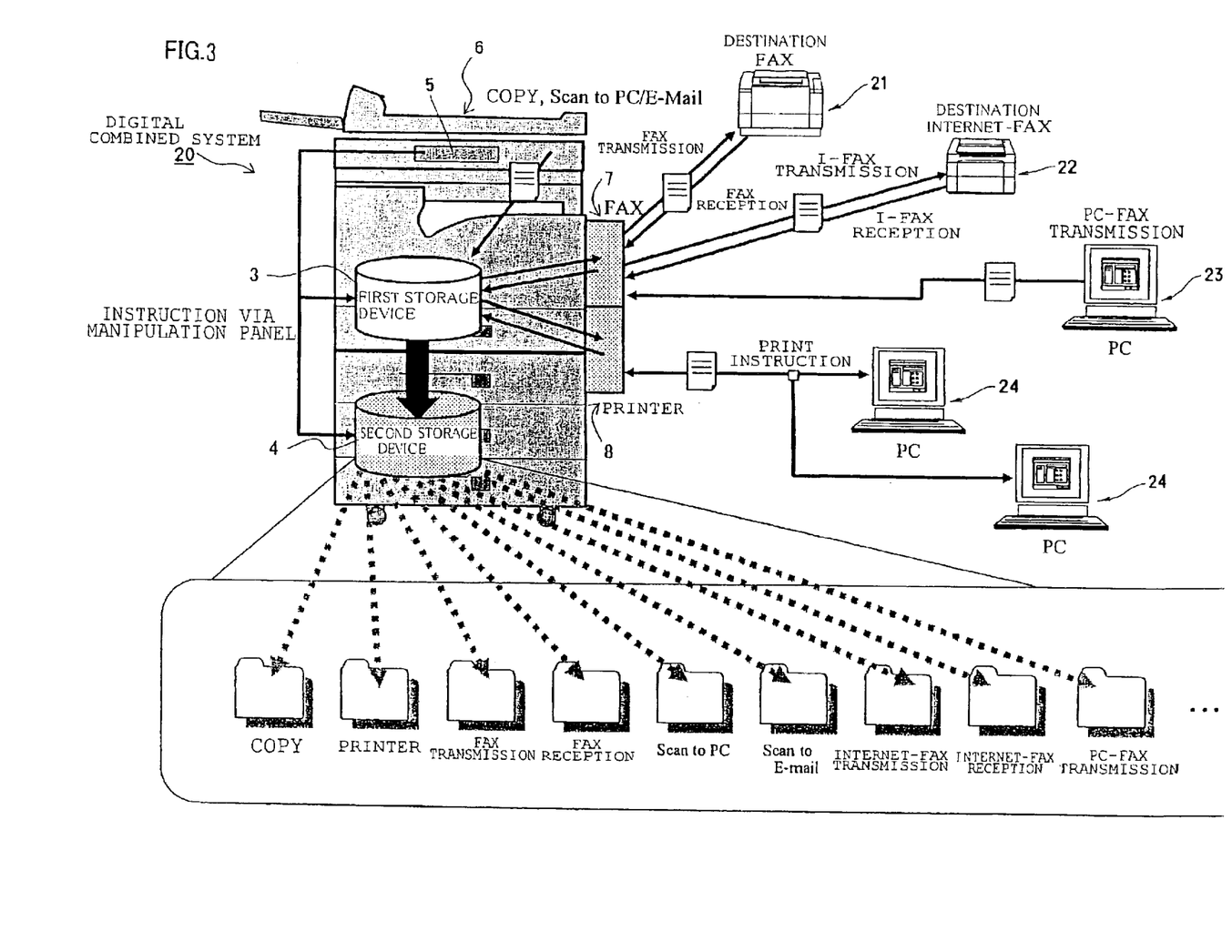
FIG. 3 is a schematic diagram showing the digital combined system having the image output apparatus of the invention and an arrangement of a second storage device.

FIG. 3 is a schematic diagram showing the digital combined system having the image output apparatus according to the invention and a configuration of the second storage device.

As shown in FIG. 3, the second storage device 4 comprises a plurality of folders.

For example, as shown in FIG. 3, the plurality of folders in the second storage device 4 can have names associated with the respective image output modes, which are the forms of the respective image data, such as "copy", "printer", "fax transmission", "fax reception", "Scan to PC", "Scan to E-mail", "Internet-fax transmission", "Internet-fax reception" and "PC-fax transmission".

In this case, the image data are stored in accordance with the image output modes and saved in the second storage device 4.

In addition, a personal folder can also be newly provided in the second storage device 4, as required.

In the "Scan to PC" folder of the second storage device 4, image data is saved which is read by the scanner section 6 of the image processor 2 and imported into the PC 24.

In the "Scan to E-mail" folder of the second storage device 4, image data is saved which is read by the scanner section 6 of the image processor 2 and attached to an e-mail when transmitting the e-mail.

In the "Internet-fax transmission" and "Internet-fax reception" folders of the second storage device 4, image data of fax signals transmitted or received via the Internet are saved, respectively.

In the "PC-fax transmission" folder of the second storage device 4, image data of fax signals transmitted from the PC 23 is saved.

Now, a method of sorting and transporting image data from the first storage device 3 to the second storage device 4 using the manipulation panel 5 in the digital combined system 20 having the image output apparatus 1 of the invention will be described with reference to FIG. 4.

Figure 4:
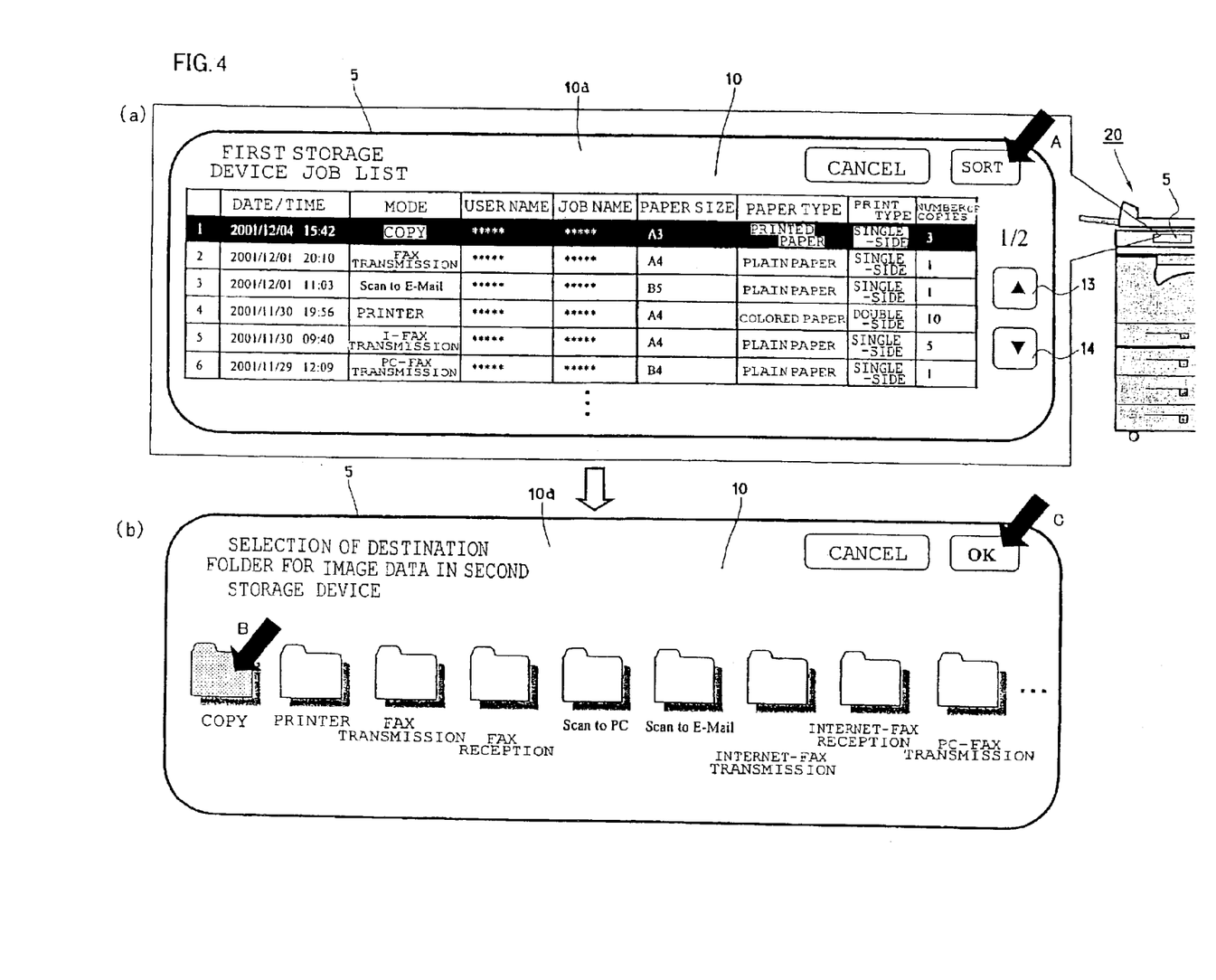
FIG. 4 illustrates a method of sorting and transporting image data from the first storage device to the second storage device on a manipulation panel of the digital combined system having the image output apparatus of the invention.

FIG. 4 illustrates a method of sorting and transporting image data from the first storage device to the second storage device using the manipulation panel in the digital combined system having the image output apparatus of the invention. FIG. 4(a) is a view of the display screen of the manipulation panel that displays a job list stored in the first storage device. FIG. 4(b) is a view of the display screen of the manipulation panel that allows the user to select a destination folder in the second storage device in which the image data is to be saved.

As shown in FIG. 4(a), the job list stored in the first storage device 3 is displayed on the display screen 10a of the display section 10 of the manipulation panel 5 of the digital combined system 20.

As shown in FIG. 4(a), the job list contains various kinds of information about the jobs each of which is a unit of image data subjected to an output process in the image output apparatus 1.

As shown in FIG. 4(a), for example, the various kinds of information about the jobs include date and time of process (date/time), image output mode (mode), user name, job name, paper size, paper type, print type (single-sided or double-sided), and the number of copies or the like.

The user name is a name of a user who utilizes the image output apparatus 1. In the case where a password is input to use the apparatus, for example, the user is identified by the password, and the user name is displayed.

The job name is a file name or the like for a job transmitted from a PC, for example.

Furthermore, as shown in FIG. 4(a), the manipulation panel 5 displaying the job list also displays an up button 13 and a down button 14. The buttons 13 and 14 can be pressed to scroll up and down, or forward and backward, the list of the job information to display a part thereof out of the display screen 10a of the display section 10 of the manipulation panel 5.

The user can select a desired job to be sorted by pressing or touching the part of the job in the list.

As shown in FIG. 4(a), the selected job is indicated by white characters (in inverse video) in the display screen 10a of the display section 10 of the manipulation panel 5, for example, to discriminate the job from the other jobs not selected.

For example, in FIG. 4(a), a job 1, which is the latest job, is selected. In this state, if the "sort" button area indicated by a narrow A, which is located in the upper right-hand corner of the display screen 10a of the display section 10 of the manipulation panel 5, is pressed, the display on the manipulation panel 5 shifts to the one shown in FIG. 4(b), as described above.

The screen display on the display section 10 of the manipulation panel 5 shown in FIG. 4(b) is to allow selection of a destination folder in the second storage device 4 in which the image data is to be saved. The plurality of folders included in the second storage device 4 described above are displayed in the display screen 10a of the display section 10 of the manipulation panel 5.

Then, the user can specify a desired folder as a destination folder by pressing the area of the folder.

In the case described above, the folders are sorted in accordance with the image output modes. Therefore, for example, as shown in FIG. 4(b), the image data of the job 1 is saved and managed in the "copy" folder in the second storage device 4 by selecting the "copy" folder indicated by an arrow B and associated with the image output mode of the job 1 in FIG. 4(a), and then pressing an "OK" button area indicated by an arrow C and located in the upper right-hand of the display screen 10a of the display section 10 of the manipulation panel 5.

In this embodiment of the invention, the image data being saved in the second storage device 4 are sorted in accordance with the image output modes. However, the invention is not limited thereto, and the image data may be sorted in other ways.

For example, folders may be prepared for individual users of the image output apparatus 1 and the image data may be sorted for the individual users.

Furthermore, the image data may be saved in the second storage device 4 in the following manner.

That is, the image output apparatus 1 of the invention may be set to save only the image data of a previously specified image output mode in the second storage device 4.

The setting can be configured by the user via the manipulation section 11 of the manipulation panel 5.

For example, a method of determining settings for storage of the jobs for the respective image output modes in the manipulation panel 5 of the digital combined system 20 having the image output apparatus 1 of the invention will be described with reference to FIG. 5.

Figure 5:
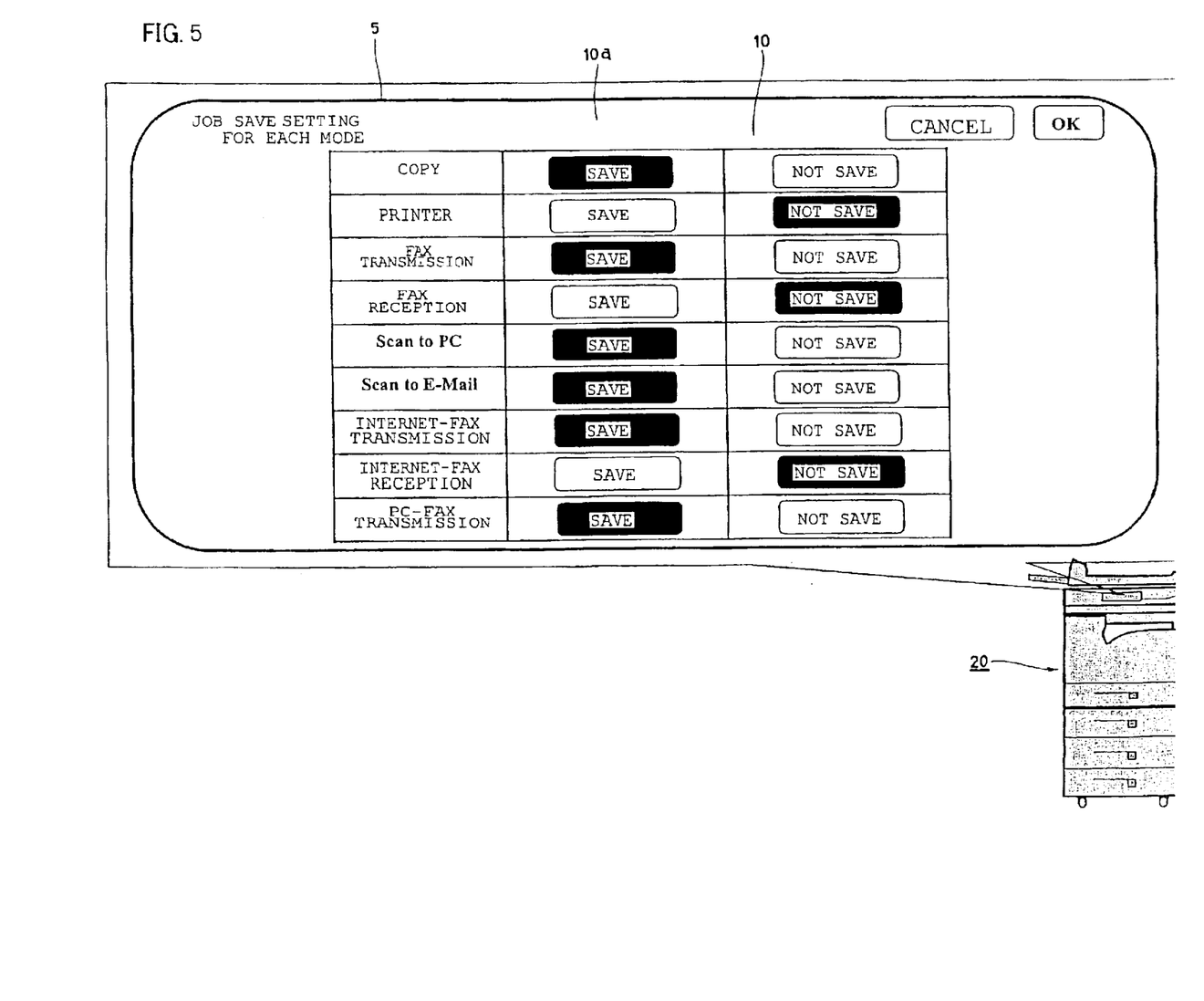
FIG. 5 is a view of a display screen of the manipulation panel of the digital combined system having the image output apparatus of the invention, the display screen allowing determination of settings for storage of the jobs for respective image output modes.

FIG. 5 is a view of a display screen of the manipulation panel of the digital combined system having the image output apparatus of the invention, the display screen allowing determination of settings for storage of the jobs for the respective image output modes.

As shown in FIG. 5, in the manipulation panel 5, two selection buttons labeled "save" and "not save" are provided for each image output mode.

Thus, for each image output mode, either to save or not to save image data having once undergone an output process in a predetermined folder prepared for the image output mode can be selected.

FIG. 5 shows an exemplary setting. The selected buttons are indicated by white characters (in inverse video) in the display screen 10a of the display section 10 of the manipulation panel 5 so as to confirm the settings for the respective image output modes.

The memory controller 12 can determine whether or not to save the image data in the second storage device 4 based on the settings for storage of the respective image data in the second storage device 4 displayed on the manipulation panel 5.

According to the arrangement described above, for example, an image output mode for which the data needs to be saved can be previously set as required by the user when the apparatus is installed.

In addition, if necessary, the settings for storage of the image data can be changed during use.

The image output apparatus 1 of the invention may be configured to allow determination whether to save or not the image data to be output in the second storage device 4 for each job, the job being a unit of image data.

Now, a method of confirming and determining a setting for storage of image data during output of the image data as a job in the "copy" mode, the "FAX transmission" mode, the "FAX reception" mode, the "Scan to PC" mode, the "Scan to E-mail" mode, the "Internet-FAX transmission" mode, and the "Internet-FAX reception" mode, will be described with reference to FIG. 6.

In this case, whether to save the image data in the second storage device 4 or not is determined via the manipulation panel 5 of the digital combined system 20.

That is, the manipulation panel 5 of the digital combined system 20 serves as an instruction unit that instructs whether or not to save the image data in the second storage device 4.

Figure 6:
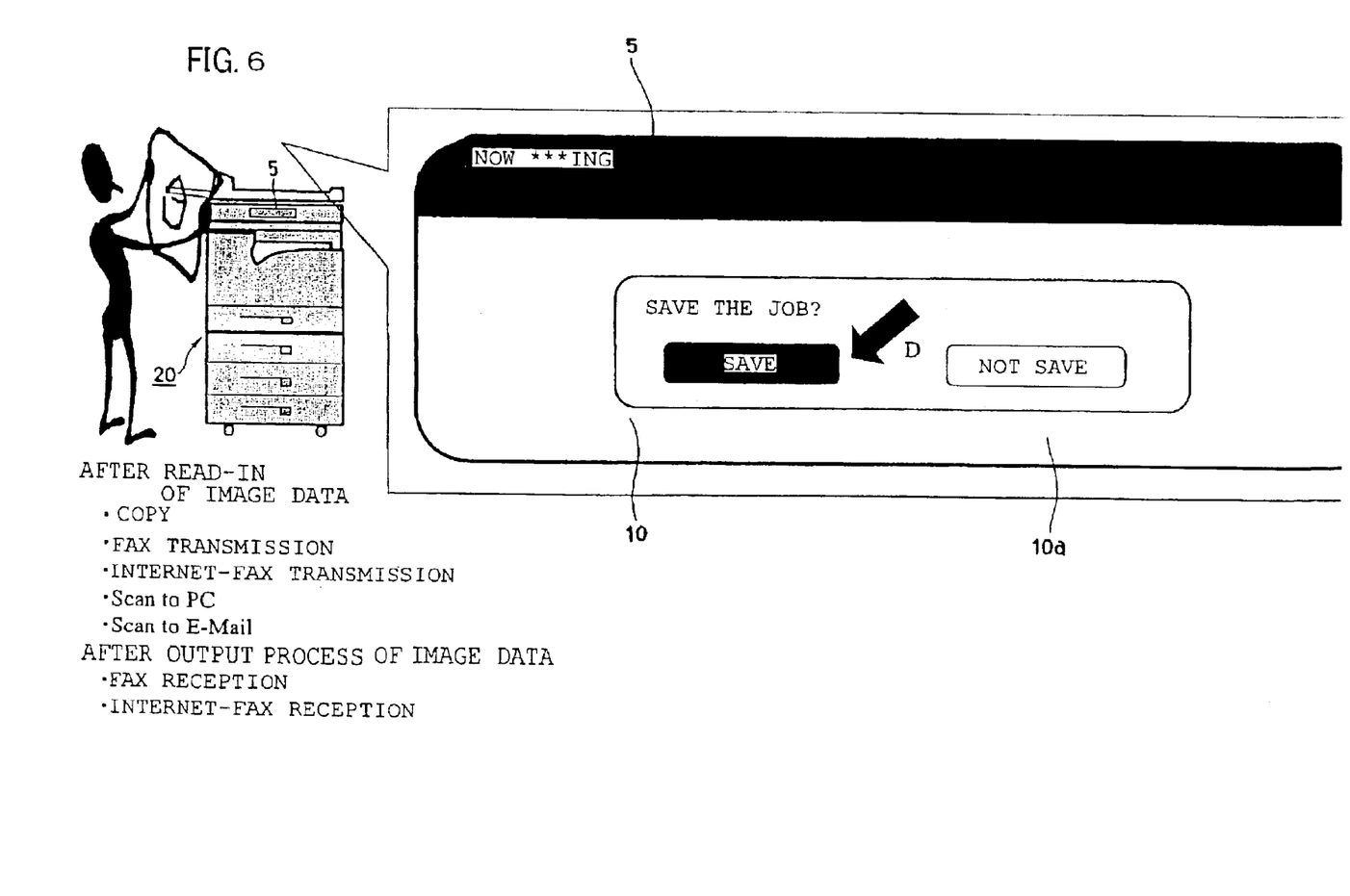
FIG. 6 is a view of a display screen of the manipulation panel of the digital combined system having the image output apparatus of the invention, the display screen allowing determination of a setting for storage of image data for each job.

FIG. 6 is a view of a display screen of the manipulation panel of the digital combined system having the image output apparatus of the invention, the display screen allowing determination of a setting for storage of image data for each job.

In FIG. 6, a statement stating "now *ing" is shown in the display screen 10***a* of the display section 10 of the manipulation panel 5. For example, in the "copy" mode, when the manipulation section 11 of the manipulation panel 5 is manipulated to copy an original, the statement is replaced with "now copying" indicating the operation state of the apparatus.

Furthermore, as shown in FIG. 6, in the lower part of the display screen 10*a* of the display section 10 of the manipulation panel 5, a statement "save the job?" and two selection buttons "save" and "not save" are displayed.

For example, since the default is the "not save", if the "save" button indicated by an arrow D is pressed, the selected "save" button is indicated by white characters (in inverse video), and the image data of the original is saved in the "copy" folder in the second storage device 4.

As for the other modes, that is, the "FAX transmission" mode, the "FAX reception" mode, the "Scan to PC" mode, the "Scan to E-mail" mode, the "Internet-FAX transmission" mode, and the "Internet-FAX reception" mode, the image data for each job can be saved in the associated folder in the second storage device 4 in the same manner.

For the "copy" mode, the "FAX transmission" mode, the "Scan to PC" mode, the "Scan to E-mail" mode and the "Internet-FAX transmission" mode, setting for storage of image data for each job described above is preferably carried out after the image data is read.

For the "FAX reception" mode and the "Internet-FAX reception" mode, setting for storage of image data for each job described above is preferably carried out after the image data is subjected to the output process.

Furthermore, for the "printer" mode and the "PC-FAX transmission" mode, setting for storage of image data for each job described above is preferably carried out on a PC which transmits the image data manipulated by the user.

That is, the PC serves as an instruction unit that instructs whether or not to save the image data in the second storage device 4 or not.

Now, a method of determining a setting for storage of image data for each job in the "printer" mode and the "PC-FAX transmission" mode will be described with reference to FIG. 7.

Figure 7:
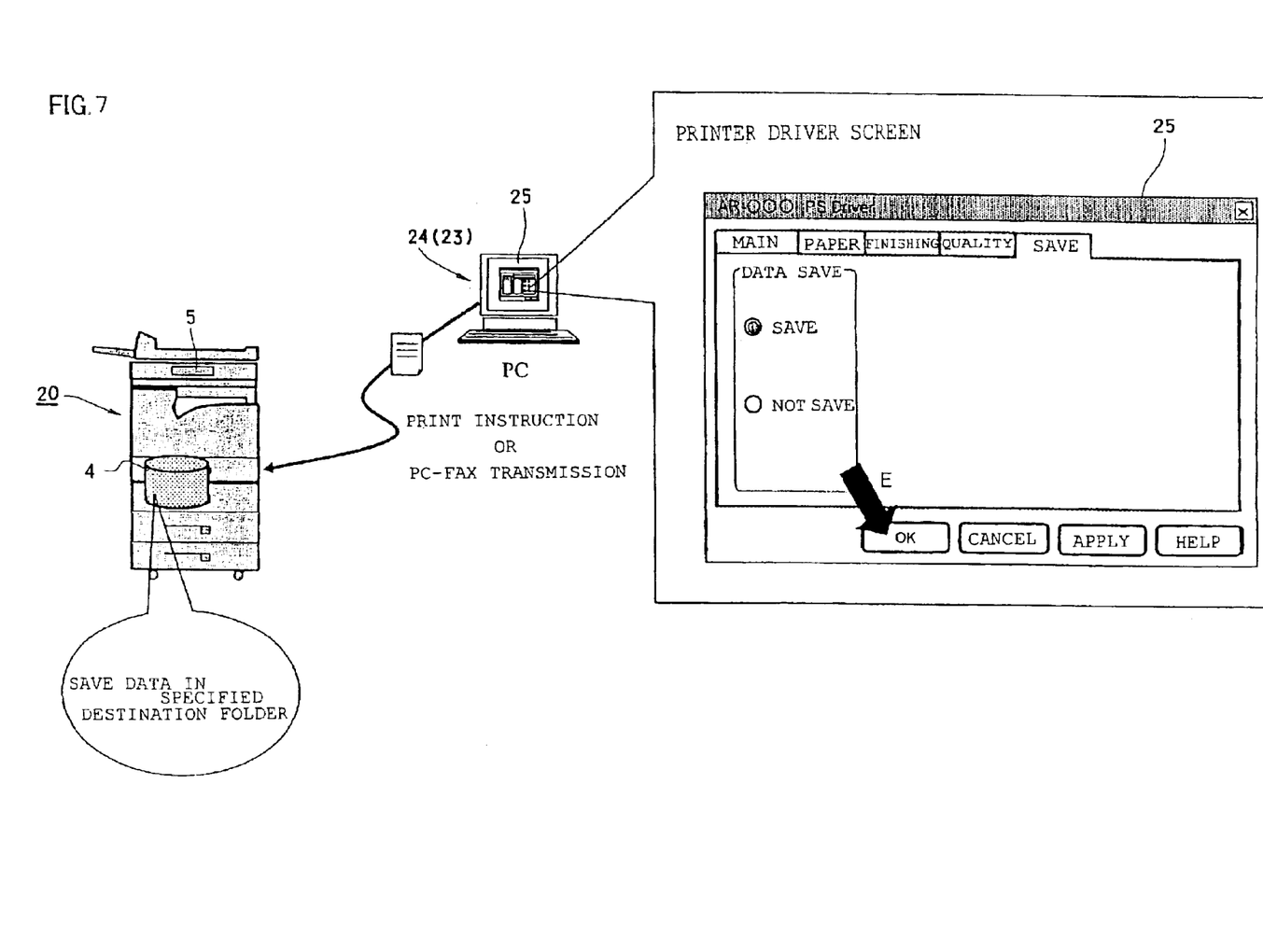
FIG. 7 shows a printer driver screen displayed by a PC connected via a network to the digital combined system having the image output apparatus according to the invention, the printer driver screen allowing setting for storage of image data for each job.

FIG. 7 shows a printer driver screen displayed by a PC connected via a network to the digital combined system having the image output apparatus according to the invention, the printer driver screen allowing setting for storage of image data for each job.

For example, in the "printer" mode, before the PC 24 instructs the digital combined system 20 to which the PC 24 is connected via a network or the like to print out a file data, a "save" selection button in a "data save" setting sheet is clicked in a printer driver screen 25 displayed on the PC 24 as shown in FIG. 7.

Then, if an "OK" key area indicated by an arrow E is clicked to instruct printing of the file data, the image data is transmitted to the image output apparatus 1 in the digital combined system 20, subjected to an output process (printed out) and saved in the "printer" folder in the second storage device 4.

In the "PC-FAX transmission" mode, the image data for each job can be saved in a predetermined folder in the second storage device 4 in the same manner.

According to the arrangement described above, whether or not to store (save) image data in the second storage device can be determined for each image data or based on choice by the user. Therefore, the setting for storage of each image data can be determined in accordance with security level, confidentiality or possibility of reuse of the image data.

As described above, the image output apparatus of the invention stores/saves image data which has once undergone an output process in the image storage means. Therefore, even if there is a need to output again the image data having once undergone an output process for the reason that the first output process has failed or the number of copies printed in the first output process has been insufficient, the same image data need not be input again.

Therefore, the load on the apparatus can be reduced and the image data can be output again in a short time.

Furthermore, since the image storage means stores/saves the image data having once undergone output processes by sorting the data in accordance with the forms/states thereof, desired image data can be easily retrieved at a later time.

Thus, the image data can be output again in a shorter time.

For digital combined systems which can process various kinds of image data, in particular, the number of output process paths and the amount of data tend to be large. The invention is effective for such cases.

In the image output apparatus of the invention, the first image storage section in the image storage means stores/saves image data having once undergone an output process, and the second image storage section in the image storage means has separate storage areas for individual forms/states of the image data. Therefore, the storage management means can sort the image data stored/saved in the first image storage section in accordance with the forms/states of the image data and store/save the sorted data in the respective storage areas associated with the forms/states of the image data in the second image storage section.

In addition, since the image storage means is separated into the first image storage section that stores image data having undergone an output process for a certain period of time and the second image storage section that stores specific image data that is extracted and sorted by the user, a desired target data can be easily found.

Furthermore, accidental deletion of necessary image data can be avoided, and a convenient system serving as an output process apparatus having a function of managing image data can be provided.

In the image output apparatus of the invention, the storage management means can determine whether to store/save image data having once undergone output processes in the second image storage section in the image storage means for each of the forms/states of the image data.

Thus, in accordance with an environment in which the image output apparatus is installed and used, the user can choose whether to store/save image data in the second image storage section in the image storage means in accordance with the image output modes of the image data, that is, the forms/states of the image data.

In the image output apparatus of the invention, the storage management means can determine in advance whether to store/save image data having once undergone output processes in the second image section in the image storage means for each image data unit.

Thus, the user can arbitrarily determine whether to store/save image data in the second image storage section in the image storage means in accordance with the security level of the image data to be output, the environment in which the image output apparatus is installed, the judgment criteria of the user, or the possibility of reuse of the image data.

What is claimed is:

1. An image output apparatus that performs output processes of a plurality of kinds of image data in different forms or states in accordance with the forms or states, comprising:

output means including first output means for outputting image data in printed form, second output means for outputting image data in fax form, and third output means for outputting image data in scanned form;

image storage means for storing or saving image data having undergone the output processes with the image data being sorted in accordance with the forms or states;

wherein said image storage means comprises a first image storage section for storing or saving the image data having undergone the output processes, a second image storage section having separate storage folders for the respective forms or states, and a storage management means for sorting the image data stored or saved in said first image storage section in accordance with the forms or states of the image data and storing or saving the sorted image data in the respective storage folders associated with the forms or states of said image data in said second image storage section, so that in the second image storage section the image data output via the first output means in printed form is stored in a first storage folder, the image data output via the second output means in fax form is stored in a second storage folder, and the image data output via the third output means in scanned form is stored in a third storage folder different than the first and second storage folders.

2. The image output apparatus according to claim 1, wherein said storage management means has a function of determining whether or not to store/save the image data having undergone the output processes in the second image storage section in said image storage means, based on settings for storage, in accordance with the forms or states of said image data.

3. The image output apparatus according to claim 1, wherein said storage management means has a function of determining whether or not to store/save the image data having undergone the output processes in the second image storage section in said image storage means for each image data unit.

4. The image output apparatus according to claim 2, wherein said storage management means has a function of determining whether or not to store/save the image data having undergone the output processes in the second image storage section in said image storage means for each image data unit.

5. A method of storing image data in connection with an image output apparatus that performs output processes of a plurality of kinds of image data in different forms or states in accordance with the different forms or states, the method comprising:

outputting image data in printed form via a printer function of the output apparatus, outputting image data in fax form via a fax function of the output apparatus, and outputting image data in scanned form via a scanning function of the output apparatus;

providing a first image storage section for storing or saving the image data having been output and a second image storage section having separate storage folders for the respective forms or states in which image data has been output, providing a storage management function that sorts the image data stored or saved in said first image storage section in accordance with the forms or states of the image data and stores or saves the sorted image data in the respective storage folders associated with the forms or states of said image data in said second image storage section, so that in the second image storage section the image data output in printed form is stored in a first storage folder, the image data output in fax form is stored in a second storage folder, and the image data output in scanned form is stored in a third storage folder different than the first and second storage folders.

* * * * *